United States Patent
Santou

(10) Patent No.: US 8,516,030 B2
(45) Date of Patent: Aug. 20, 2013

(54) CARRY LOOK-AHEAD CIRCUIT AND CARRY LOOK-AHEAD METHOD

(75) Inventor: Moriyuki Santou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 861 days.

(21) Appl. No.: 12/385,008

(22) Filed: Mar. 27, 2009

(65) Prior Publication Data

US 2009/0187617 A1 Jul. 23, 2009

Related U.S. Application Data

(63) Continuation of application No. PCT/JP2006/319363, filed on Sep. 28, 2006.

(51) Int. Cl.
   *G06F 7/50* (2006.01)

(52) U.S. Cl.
   USPC .......................................... 708/710; 708/700

(58) Field of Classification Search
   USPC .................................. 708/710–713
   See application file for complete search history.

(56) References Cited

U.S. PATENT DOCUMENTS

| | | | | |
|---|---|---|---|---|
| 4,180,861 A | * | 12/1979 | Armstrong et al. | 712/224 |
| 4,263,660 A | * | 4/1981 | Prioste | 708/230 |
| 4,730,266 A | * | 3/1988 | van Meerbergen et al. | 708/711 |
| 5,544,085 A | | 8/1996 | Sali et al. | |
| 5,933,362 A | * | 8/1999 | Inoue | 708/711 |
| 6,782,406 B2 | * | 8/2004 | Koshy | 708/710 |
| 7,256,622 B2 | * | 8/2007 | Dronavalli | 326/121 |
| 7,395,307 B2 | * | 7/2008 | Ikeno | 708/710 |
| 2004/0153490 A1 | | 8/2004 | Talwar et al. | |

FOREIGN PATENT DOCUMENTS

| | | |
|---|---|---|
| EP | 0296344 A2 | 12/1988 |
| JP | 6-35668 | 2/1994 |
| JP | 6-314186 | 11/1994 |
| JP | 8-123662 | 5/1996 |

OTHER PUBLICATIONS

Diana Palsetia, "Digital Logic and Boolean Algebra", Lecture Notes, University of Pennsylvania, Spring 2007. Retrieved from: http://www.cis.upenn.edu/~palsetia/cit595s07/index.html.*
Steven Johnson, "Chapter 1—Digital Logic", Lecture Notes, University of Indiana, Sep. 12, 2006. Retrieved from: http://web.archive.org/web/20060912131843/http://www.cs.indiana.edu/classes/b441-sjoh/notes/ADD/1.pdf.*
Yu-Ting Pai and Yu-Kumg Chen, "The Fastest Carry Look ahead Adder", Proceedings of the Second IEEE International Workshop on Electronic Design, Test and Applications, pp. 434-436, 2004.*

(Continued)

*Primary Examiner* — Chuong D Ngo
*Assistant Examiner* — Matthew Sandifer
(74) *Attorney, Agent, or Firm* — Staas & Halsey LLP

(57) ABSTRACT

A carry look-ahead circuit generates a generate output for generating a carry, from a plurality of inverted generate inputs and a plurality of inverted propagate inputs to peer bits of a first operand and a second operand including a plurality of bits. The carry look-ahead circuit includes a circuit that receives the inverted generate inputs excluding the inverted generate input of a most significant bit among the inverted generate inputs and the inverted propagate inputs and generates an inverted pseudo generate signal of the generate output; and a circuit that receives the inverted generate input of the most significant bit among the inverted generate inputs and the inverted pseudo generate signal and outputs the generate output.

11 Claims, 10 Drawing Sheets

(56) References Cited

OTHER PUBLICATIONS

Gary Bewick et al., "Approaching a Nanosecond: A 32 bit Adder," Proceedings of the 1988 IEEE International Conference on Computer Design: VLSI in Computers and Processors, ICCD '88, Oct. 1988, pp. 221-226.

Huey Ling, "High-Speed Binary Adder," IBM Journal of Research and Development, vol. 25, No. 3, May 1981, pp. 156-166.

Giorgos Dimitrakopoulos et al., "High-Speed Parallel-Prefix VLSI Ling Adders," IEEE Transactions on Computers, vol. 54, No. 2, Feb. 2005, pp. 225-231.

Decision of a Patent Grant for JP 2008/536265, issued on May 25, 2010 and mailed on Jun. 8, 2010.

International Search Report for International Application No. PCT/JP2006/319363, mailed Nov. 14, 2006.

* cited by examiner

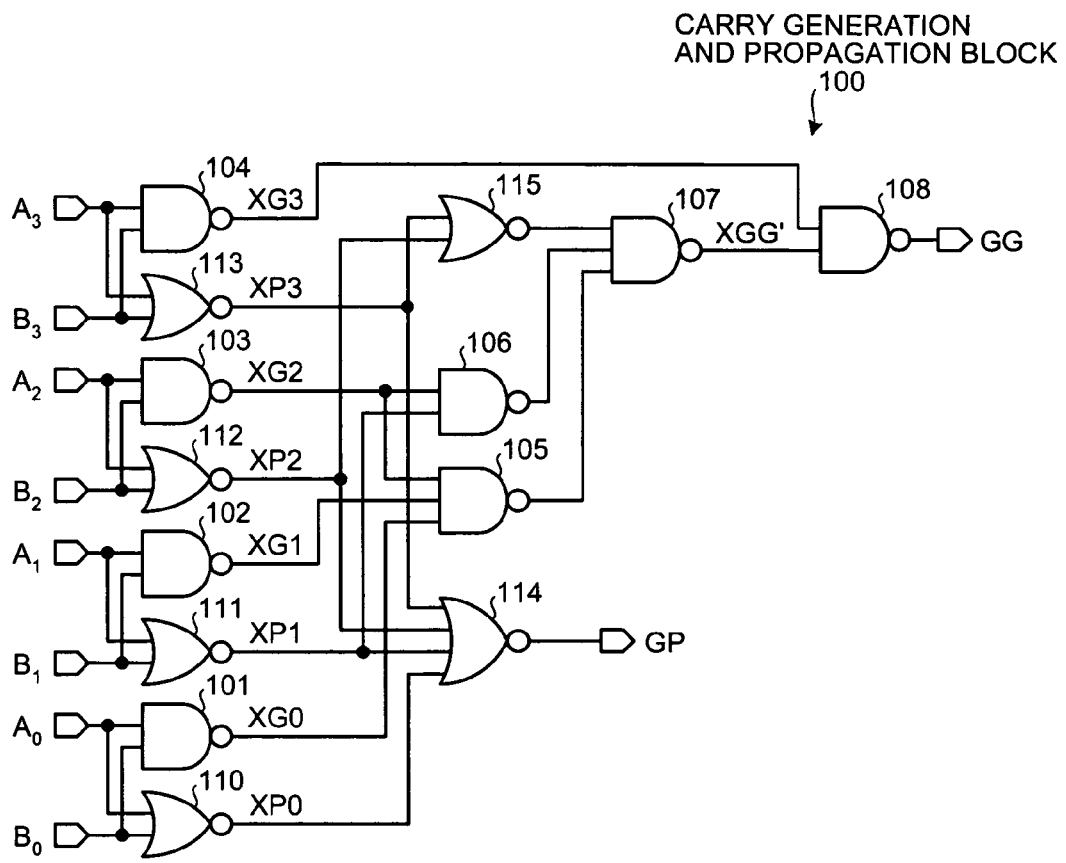

RELATED ART

RELATED ART

RELATED ART

CARRY LOOK-AHEAD CIRCUIT AND CARRY LOOK-AHEAD METHOD

CROSS-REFERENCE TO RELATED APPLICATION(S)

This application is a continuation of PCT international application Ser. No. PCT/JP2006/319363 filed on Sep. 28, 2006 which designates the United States, incorporated herein by reference, the entire contents of which are incorporated herein by reference.

FIELD

The present invention relates to a carry look-ahead circuit that generate, from a plurality of inverted transfer inputs and a plurality of inverted propagate inputs to peer bits of a first operand and a second operand including a plurality of bits, a generate output for generating a carry.

BACKGROUND

In recent years, a carry look-ahead (CLA) circuit is widely adopted to improve arithmetic operation speed in an adder of a semiconductor integrated circuit (see, for example, Japanese Laid-open Patent Publication No. 6-35668 and Japanese Laid-open Patent Publication No. 8-123662). FIG. 10 is a diagram of a carry generation and propagation block (a block for generating a generate signal and a propagate signal for four bits) of a conventional CLA circuit. As depicted in the figure, the CLA circuit includes NAND gates 10 to 18, NOR gates 20 to 23, and NOT gates 30 to 39. $A_0$ to $A_3$ in the figure correspond to a first bit to a fourth bit of a first operand as an arithmetic operation target. $B_0$ to $B_3$ in the figure correspond to a first bit to a fourth bit of a second operand as an arithmetic operation target.

Signals output from the NOT gates 31, 33, 35, and 37 are represented as generate output signals G0 to G3 ($Gn=A_n \cdot B$), respectively, and signals output from the NOT gates 30, 32, 34, and 36 are represented as propagate output signals P0 to P3 ($Pn=A_n+B_n$), respectively. A generate signal (GG) is calculated by GG=G3+P3·G2+P3·P2·G1+P3·P2·P1·G0. A propagate signal (GP) is calculated by GP=P3·P2·P1·P0. A carry is calculated by using the generate signal and the propagate signal.

For example, a carry obtained by adding up a 16-bit first operand and a 16-bit second operand is represented as CO (carry out). The carry CO can be calculated by CO=GG3+GP3·GG2+GP3·GP2·GG1+GP3·GP2·GP2·GG0+GP3·GP2·GP1·GP0·CI by using the generate signal and the propagate signal.

GG0 corresponds to generate signals of first bits to fourth bits of the first and second operands as an arithmetic operation targets. GG1 corresponds to generate signals of fifth bits to eighth bits of the first and second operands as arithmetic operation targets. GG2 corresponds to generate signals of ninth bits to twelfth bits of the first and second operands as arithmetic operation targets. GG3 corresponds to generate signals of thirteenth bits to sixteenth bits of the first and second operands as arithmetic operation targets.

GP0 corresponds to propagate signals of the first bits to fourth bits of the first and second operands as arithmetic operation targets. GP1 corresponds to propagate signals of the fifth bits to eighth bits of the first and second operands as arithmetic operation targets. GP2 corresponds to propagate signals of the ninth bits to twelfth bits of the first and second operands as arithmetic operation targets. GP3 corresponds to propagate signals of the thirteenth bits to sixteenth bits of the first and second operands as arithmetic operation targets. CI represents a carry from a low order digit.

Conventionally, a technology called pseudo carry is also used. In the pseudo carry, pseudo signals are used for the generate signal and the propagate signal of the CLA circuit explained with reference to FIG. 10, thereby reducing the number of inputs of gates to realize an increase in speed of a CLA circuit and a reduction in the number of transistors. FIG. 11 is a diagram of a carry generation and propagation circuit of a CLA circuit (a 4-bit CLA circuit) to which the pseudo carry is applied. As depicted in the figure, the CLA circuit includes NAND gates 40 to 47, NOR gates 50 to 54, and NOT gates 60 to 68.

Signals output from the NOT gates 61, 63, 65, and 67 are represented as generate output signals G0 to G3, respectively. Signals output from the NOT gates 60, 62, 64, and 66 are represented as propagate output signals P0 to P3, respectively. A pseudo generate signal (GG') is calculated by GG'=G3+G2+P2·G1+P2·P1·G0. A pseudo propagate signal (GP') is calculated by GP'=P2·P1·P0·P(n−1). A pseudo carry is calculated by using the pseudo generate signal and the pseudo propagate signal. If $A_n$ and $B_n$ depicted in FIG. 11 are least significant bits (when n is 0), a value of P(n−1) is 1.

A pseudo carry obtained by adding up a 16-bit first operand and a 16-bit second operand is represented as CO'. The pseudo carry CO' can be calculated by CO'=GG3'+GP3'·GG2'+GP3'·GP2'·GG1'+GP3'·GP2'·GP1'·GG0'+GP3'·GP2'·GP0'·CI by using the generate signal and the propagate signal.

GG0' corresponds to pseudo generate signals of the first bits to fourth bits of the first and second operands as arithmetic operation targets. GG1' corresponds to pseudo generate signals of the fifth bits to eighth bits of the first and second operands as arithmetic operation targets. GG2' corresponds to pseudo generate signals of the ninth bits to twelfth bits of the first and second operands as arithmetic operation targets. GG3' corresponds to pseudo generate signals of the thirteenth bits to sixteenth bits of the first and second operands as arithmetic operation targets.

GP0' corresponds to pseudo propagate signals of the first bits to fourth bits of the first and second operands as arithmetic operation targets. GP1' corresponds to pseudo propagate signals of the fifth bits to eighth bits of the first and second operands as arithmetic operation targets. GP2' corresponds to pseudo propagate signals of the ninth bits to twelfth bits of the first and second operands as arithmetic operation targets. GP3' corresponds to pseudo propagate signals of the thirteenth bits to sixteenth bits of the first and second operands as arithmetic operation targets. CI represents a carry from a low order digit.

The carry CO can be calculated by an AND of the pseudo carry CO' and a propagate output signal Pn for a most significant bit (CO=CO'·Pn; n is a digit of the most significant bit). For example, if a 16-bit pseudo carry CO' and a 16-bit propagate output signal Pn are added up, the carry CO can be calculated by CO=CO'·P15(P15=$A_{15}$+$B_{15}$).

When FIG. 10 and FIG. 11 are compared, whereas the number of inputs of the NAND gate 18 at a first stage from the right in FIG. 10 is four, the number of inputs of the NAND gate 47 at a first stage from the right in FIG. 11 is reduced to three. Whereas the number of inputs of the NAND gate 15 at a second stage from the right in FIG. 10 is four, the number of inputs of the NAND gate 45 at a second stage from the right in FIG. 11 is reduced to three. In this way, it is possible to reduce the number of inputs of the gates and realize an increase in speed of the CLA circuit and a reduction in the number of transistors by using the pseudo carry.

Conventionally, the number of transistors of a CLA circuit is reduced and the number of stages of gates is reduced to realize an increase in speed of the CLA circuit by using an inverse logic. The inverse logic is a logic for generating inverted signals (XGG and XGP) of a generate signal and a propagate signal from inverted signals XGn and XPn of Gn and Pn ad using the inverted signals (XGG and XGP) as they are. FIG. 12 is a diagram of a carry generation and propagation block of a CLA circuit to which the inverse logic is applied.

As depicted in the figure, the CLA circuit includes NAND gates 70 to 77, NOR gates 80 to 84, and NOT gates 90 and 91. Signals output from the NAND gates 70 to 73 are represented as inverted generate signals XG0 to XG3, respectively. Signals output from the NOR gates 80 to 83 are represented as inverted propagate signals XP0 to XP3, respectively. An inverted signal of a generate signal (XGG; hereinafter, "inverted generate signal") is calculated by XGG=XP3+ XG3·XP2+XG3·XG2·XP1+XG3·XG2·XG1·XG0. An inverted signal of a propagate signal (XGP; hereinafter, "inverted propagate signal") is calculated by XGP=XP3+ XP2+XP1+XP0. The inverted generate signal XGG passes through the NOT gate 91 to change to the generate signal GG. The inverted propagate signal changes to the propagate signal GP in the NOR gate 84.

When FIG. 10 and FIG. 12 are compared, NOT gates corresponding to the NOT gates 30 to 37 depicted in FIG. 10 are deleted from the CLA circuit depicted in FIG. 12. Instead, a NOT gate 91 is added to the CLA circuit depicted in FIG. 12. In this way, it is possible to reduce the number of transistors and realize an increase in speed of the CLA circuit by using the inverse logic.

As explained above, when a generate signal is generated, it is possible to reduce the number of inputs in the gates by using the pseudo carry (see FIG. 11). However, the number of transistors increases when an addition result is generated by using a pseudo carry signal. Therefore, the pseudo carry signal (CO') is converted into the normal carry signal (CO) and used (CO=CO'·Pn).

When the pseudo carry signal (CO') is converted back into the normal carry signal (CO), an AND gate for taking AND of the pseudo carry signal (CO') and the propagate output signal Pn of the most significant bit is required. Therefore, while the effect of reducing the number of transistors can be maintained, the number of stages increases and the advantage of an increase in speed of the CLA circuit is lost.

Further, when a multi-bit CLA circuit is configured by using the inverse logic, the NOT gate 91 (see FIG. 12) for resetting the polarity of an inverted generate signal is required. As a result, the number of gate stages cannot be reduced and an increase in speed of the CLA circuit cannot be efficiently performed.

SUMMARY

According to an aspect of the invention, a carry look-ahead circuit generates a generate output for generating a carry, from a plurality of inverted generate inputs and a plurality of inverted propagate inputs to peer bits of a first operand and a second operand including a plurality of bits. The carry look-ahead circuit includes a circuit that receives the inverted generate inputs excluding the inverted generate input of a most significant bit among the inverted generate inputs and the inverted propagate inputs and generates an inverted pseudo generate signal of the generate output; and a circuit that receives the inverted generate input of the most significant bit among the inverted generate inputs and the inverted pseudo generate signal and outputs the generate output.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a diagram of a carry generation and propagation block of a CLA circuit (a carry look-ahead circuit) according to an embodiment of the present invention;

FIG. 2 is a diagram of a result obtained by comparing the number of transistors and the number of gate stages for generation of a generate signal GG in the carry look-ahead circuit according to the embodiment with those of conventional circuits;

DESCRIPTION OF EMBODIMENT(S)

Preferred embodiments of the present invention are explained in detail below. The present invention is not limited by the exemplary embodiments.

Figure 11:
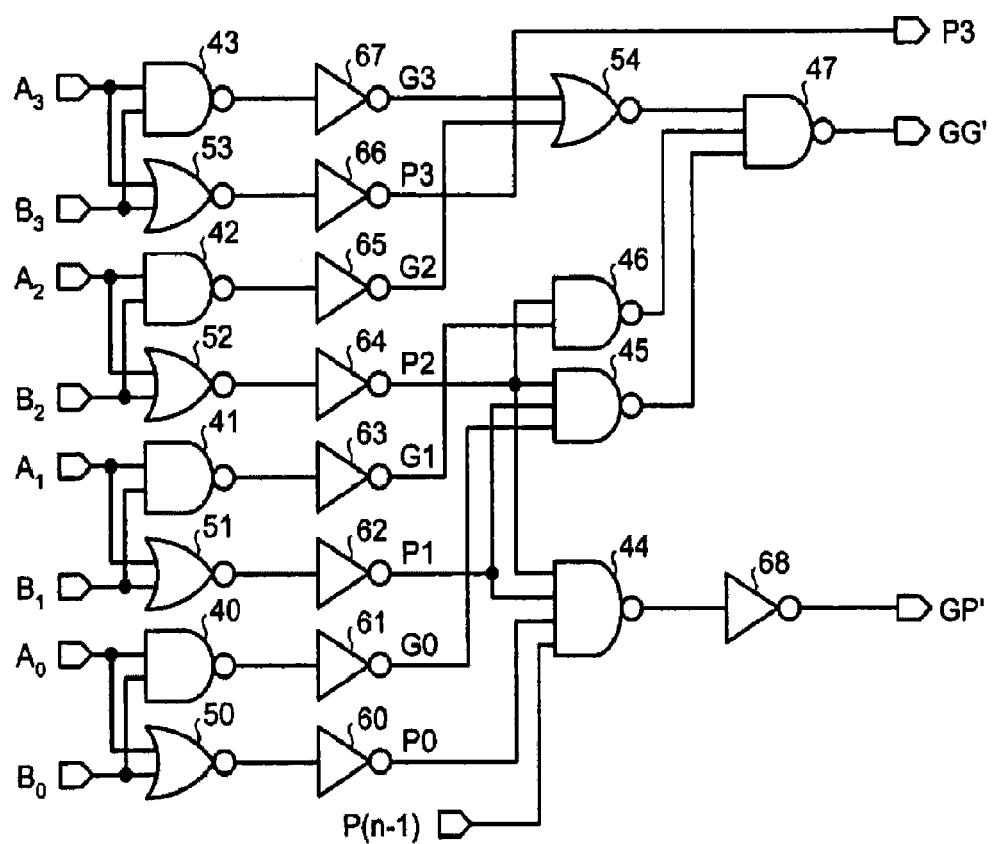
FIG. 11 is a diagram of a carry generation and propagation block of a CLA circuit to which pseudo carry is applied.
Figure 12:
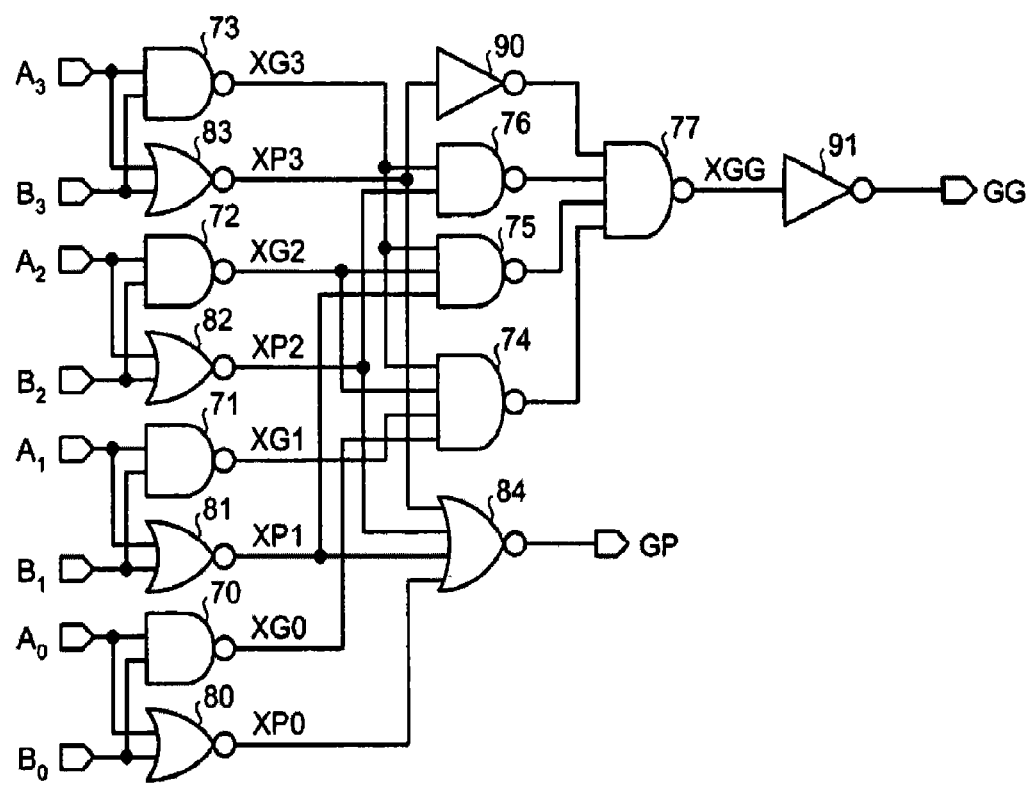
FIG. 12 is a diagram of a carry generation and propagation block of a CLA circuit to which an inverse logic is applied.

The pseudo carry and the inverse logic explained above with reference to FIGS. 11 and 12 are applied to a carry look-ahead (CLA) circuit according to an embodiment of the present invention. An increase in speed of the CLA circuit and a reduction in the number of transistors, which are the effects of the pseudo carry, are realized by a section for generating a generate signal. Therefore, attention is paid to such a section and the inverse logic is applied to a logic of the section.

FIG. 1 is a diagram of a carry generation and propagation block 100 of a CLA circuit (a carry look-ahead circuit) according to this embodiment. As depicted in FIG. 1, the carry generation and propagation block 100 includes NAND gates 101 to 108 and NOR gates 110 to 115. Signals output from the NAND gates 101 to 104 are represented as inverted generate signals XG0 to XG3, respectively, and signals output from the NOR gates 110 to 113 are represented as inverted propagate signals XP0 to XP3, respectively. A logical expression for an inverted pseudo generate signal XGG' output from the NAND gate 107 can be indicated by the following expression (when first and second operands as arithmetic operation targets are 4-bit operands, respectively):

$XGG'=XP3+XP2+XG2\cdot XP1+XG2\cdot XG1\cdot XG0$

When the first and second operands as arithmetic operation targets are n-bit (n is a positive integer) operands, respectively, a generate signal GG can be indicated by the following expression:

$GG=$ $G(n-1)+$ $P(n-1)\cdot G(n-2)+$ $P(n-1)\cdot P(n-2)\cdot G(n-3)+$ $P(n-1)\cdot P(n-2)\cdot P(-3)\cdot G(n-4)+$ $\ldots$ $P(n-1)\cdot P(n-2)\cdot P(n-3)\cdot \ldots \cdot G2\cdot G1+$ $P(n-1)\cdot P(n-2)\cdot P(n-3)\cdot \ldots \cdot P2\cdot P1\cdot G0$ An inverted generate signal XGG as a negation result of GG can be indicated by the following expression:

$XGG=$ $XP(n-1)+$ $XG(n-1)\cdot XP(n-2)+$ $XG(n-1)\cdot XG(n-2)\cdot XP(n-3)+$ $XG(n-1)\cdot XG(n-2)\cdot XG(-3)\cdot XP(n-4)+$ $\ldots$ $XG(n-1)\cdot XG(n-2)\cdot XG(n-3)\cdot \ldots \cdot XG2\cdot XP1+$ $XG(n-1)\cdot XG(n-2)\cdot XG(n-3)\cdot \ldots \cdot XG2\cdot XG1\cdot XG0$ An inverted pseudo generate signal XGG' obtained by further dividing the inverted generate signal XGG by XG(n−1) can be indicated by the following expression:

$XGG'=$ $XP(n-1)+$ $XP(n-2)+$ $XG(n-2)\cdot XP(n-3)+$ $XG(n-2)XG(n-3)\, XP(n-4)+$ $\ldots$ $XG(n-2)\cdot XG(n-3)\cdot \ldots \cdot XG2\cdot XP1+$ $XG(n-2)\cdot XG(n-3)\cdot \ldots \cdot XG2\cdot XG1\cdot XG0$ An AND of an inverted generate signal of a most significant bit among inverted generate signals and the inverted pseudo generate signal XGG' is the inverted generate signal XGG. In the example depicted in FIG. 1, the inverted generate signal XGG is calculated by an AND of the inverted pseudo generate signal XGG' and the inverted generate signal XG3 (XGG=XG3·XGG').

When the generate signal GG used for carry generation is generated from n-bit operands, it is sufficient to generate an inverted generate signal from an AND of the inverted pseudo generate signal XGG' and an n-th inverted generate signal XG(n−1) and invert the polarity of the inverted generate signal.

Therefore, the NAND gate 108 can be used as both a stage for resetting the polarity of a signal inverted by the inverse logic (a NOT gate) and a stage for resetting a pseudo generate signal by the pseudo carry to a normal generate signal (an AND gate). Consequently, it is possible to reduce the number of inputs of gates without increasing the number of stages of the gates.

In FIG. 1, an inverted propagate signal XGP to which the inverse logic is applied is indicated by the following expression (when the first and second operands as arithmetic operation targets are 4-bit operands, respectively):

$XGP=XP3+XP2+XP1+XP0$

The inverted propagate signal changes to a propagate signal GP in the NOR gate 114.

When the first and second operands as arithmetic operation targets are n-bit (n is a positive integer), respectively, a propagate signal GP can be indicated by the following expression:

$GP=!(XP(n-1)+XP(n-2)+\ldots+XP0)$

FIG. 2 is a diagram of a result obtained by comparing the number of transistors and the number of gate stages for generation of a generate signal GG in the carry look-ahead circuit according to the embodiment with those of conventional circuits. As depicted in the figure, in a normal circuit (to which the pseudo carry and the inverse logic are not applied), the number of transistors is 86 and the number of gate stages for generation of the generate signal GG is 4. In a circuit to which only the pseudo carry is applied, the number of transistors is 78 and the number of gate stages for generation of the generate signal GG is 4 (plus an AND gate). In a circuit to which only the inverse logic is applied, the number of transistors is 70 and the number of gate stages for generation of the generate signal GG is 4.

In the carry generation and propagation block 100 according to this embodiment, the number of transistors is 64 and the number of gate stages for generation of the generate signal GG is 4. The inverse logic is applied to a logic of a generate signal of the pseudo carry, and a delay of a stage for taking AND with an inverted generate signal Pn of a most significant bit is not seen. Therefore, an effect of improvement of the delay through a reduction in the number of inputs of gates (a reduction in the number of vertically stacked stages of transistors) and an effect of a reduction in the number of transistors, which are effects of the pseudo carry, are obtained.

Figure 3:
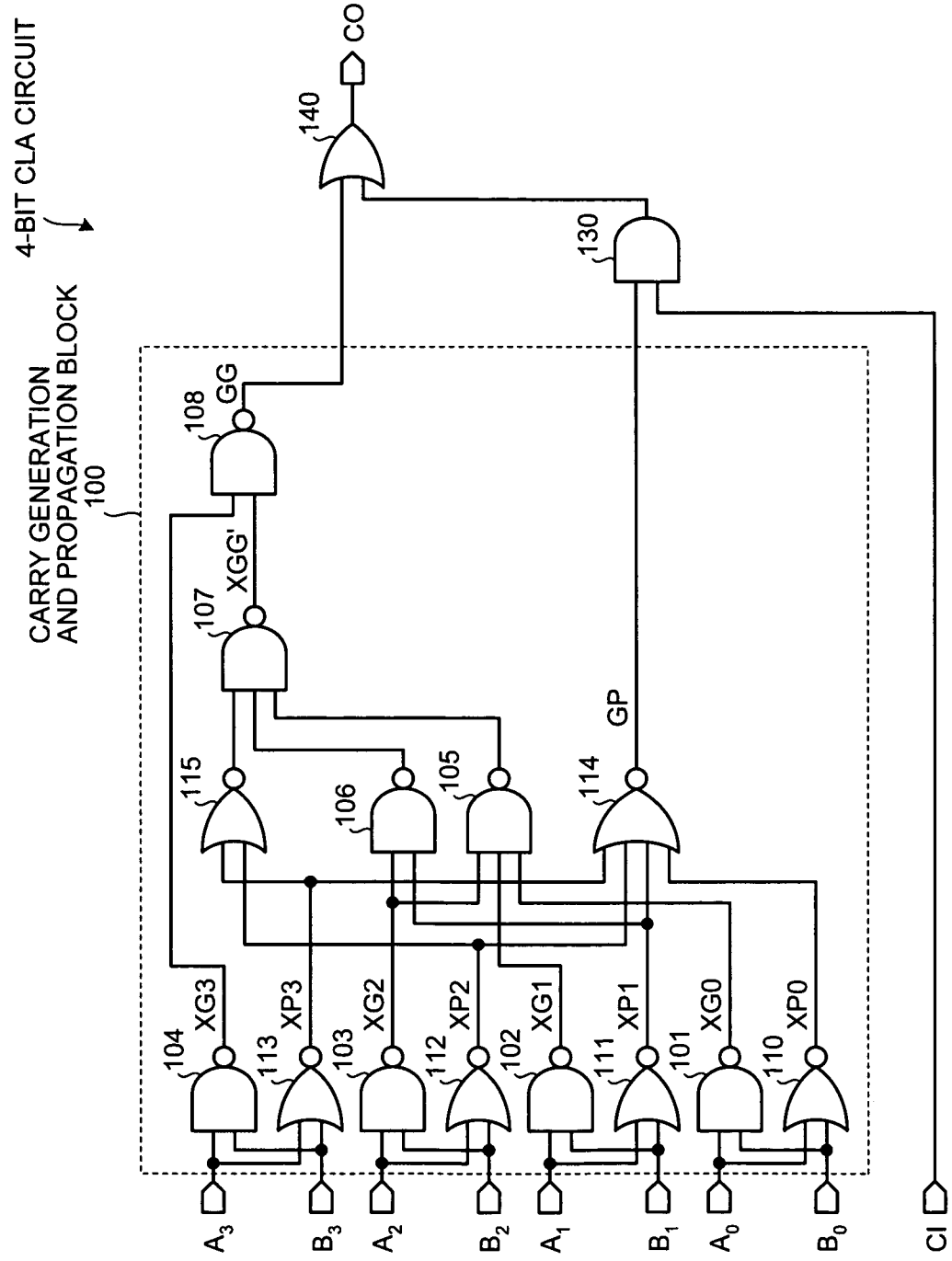
FIG. 3 is a diagram of an example of a 4-bit CLA circuit (carry look-ahead circuit) according to the embodiment.

An example of a 4-bit CLA circuit to which the carry generation and propagation block 100 depicted in FIG. 1 is applied is explained below. FIG. 3 is a diagram of an example of a 4-bit CLA circuit (carry look-ahead circuit) according to this embodiment. A carry CO output from the 4-bit CLA circuit can be represented as CO=GG+GP·CI (CI is a carry from a low order digit) using the 4-bit generate signal GG and the propagate signal GP depicted in FIG. 1.

As depicted in FIG. 3, the CLA circuit includes the carry generation and propagation block 100, an AND gate 130, and an OR gate 140. A carry signal and a propagate signal GP output from the carry generation and propagation block 100 are input to the AND gate 130 and a generate signal GG output from the carry generation and propagation block 100 and a propagating carry signal output from the AND gate 130 are input to the OR gate 140. A carry CO (corresponding to a carry for a fifth bit) is generated from the OR gate 140.

In FIG. 3, the carry signal is input to the AND gate 130. However, it is also possible that the AND gate 130 is omitted, a 5-input NOR gate is provided instead of the NOR gate 114 (see FIG. 1), an inverted carry signal is input to the 5-input NOR gate, and a carry CO is generated according to an AND of an output signal from the 5-input NOR gate and the generate signal GG. In this case, a NOT gate is required for inverting the carry signal.

Figure 4:
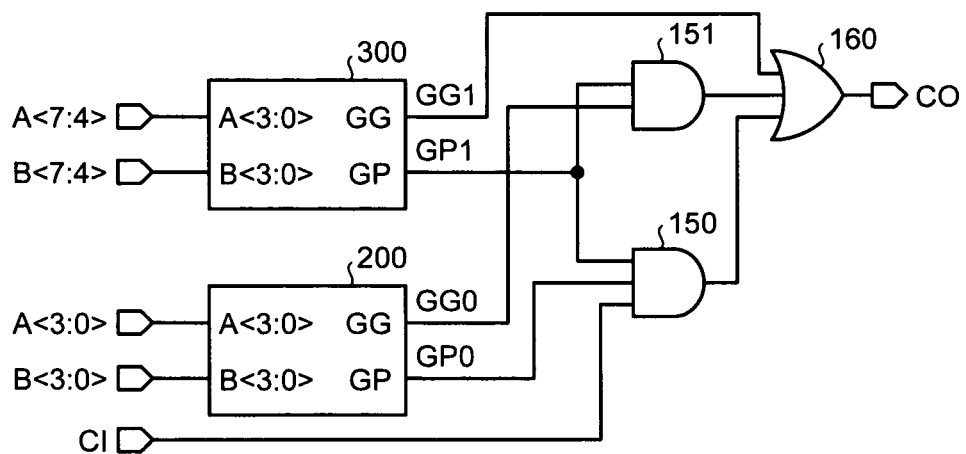
FIG. 4 is a diagram of an example of an 8-bit CLA circuit according to the embodiment.

An example of an 8-bit CLA circuit to which the carry generation and propagation block 100 depicted in FIG. 1 is applied is explained below. FIG. 4 is a diagram of an example of an 8-bit CLA circuit according to this embodiment. A carry CO output from the 8-bit CLA circuit can be represented as CO=GG1+GP1·GG0+GP1·GP0·CI (CI is a carry from a low order digit).

GG0 corresponds to generate signals of first bits to fourth bits of first and second operands as arithmetic operation targets. GG1 corresponds to generate signals from fifth bits to eighth bits of the first and second operands as arithmetic operation targets.

GP0 corresponds to propagate signals of the first bits to fourth bits of the first and second operands as arithmetic operation targets. GP1 corresponds to propagate signals of the fifth bits to eighth bits of the first and second operands as arithmetic operation targets.

As depicted in FIG. 4, the CLA circuit includes carry generation and propagation blocks 200 and 300, AND gates 150 and 151, and an OR gate 160. The carry generation and propagation blocks 200 and 300 are the same as the carry generation and propagation block 100 explained with reference to FIG. 1. Therefore, explanation of the carry generation and propagation blocks 200 and 300 is omitted. First and second operands of first bits to fourth bits as arithmetic operation targets are input to the carry generation and propagation block 200. First and second operands of fifth bits to eighth bits as arithmetic operation targets are input to the carry generation and propagation block 300.

A propagate signal GP0 output from the carry generation and propagation block 200, a propagate signal GP1 output from the carry generation and propagation block 300, and a carry signal (CI) are input to the AND gate 150. The generate signal GG0 output from the carry generation and propagation block 200 and the propagate signal GP1 output from the carry generation and propagation block 300 are input to the AND gate 151. A generate signal GG1 output from the carry generation and propagation block 300, a signal output from the AND gate 150, and a signal output from the AND gate 151 are input to the OR gate 160. A carry CO (corresponding to a carry for a ninth bit) is generated from the OR gate 160.

Figure 5:
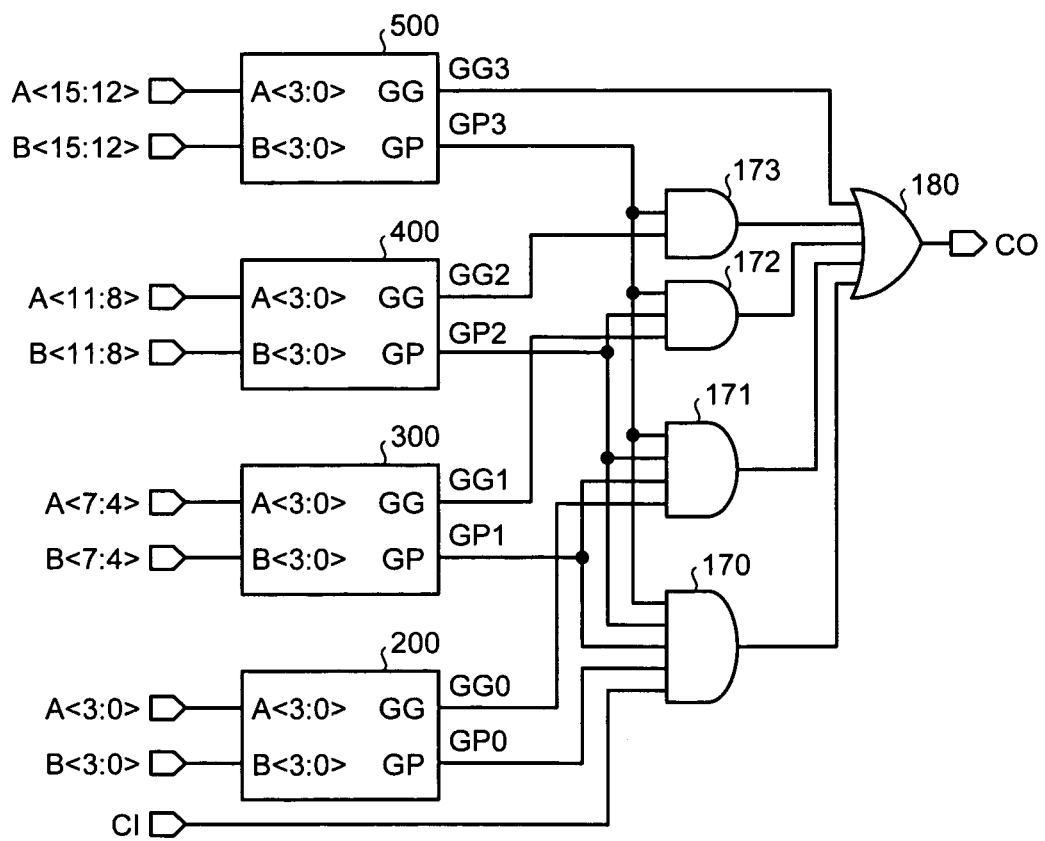
FIG. 5 is a diagram of an example of a 16-bit CLA circuit according to the embodiment.

An example of a 16-bit CLA circuit to which the carry generation and propagation block 100 depicted in FIG. 1 is applied is explained below. FIG. 5 is a diagram of an example of a 16-bit CLA circuit according to this embodiment. A carry CO output from the 16-bit CLA circuit can be represented as CO=GG3+GP3·GG2+GP3·GP2·GG1+ GP3·GP2·GP1·GG0+GP3·GP2·GP1·GP0·CI.

GG0 corresponds to generate signals of first bits to fourth bits of first and second operands as arithmetic operation targets. GG1 corresponds to generate signals of fifth bits to eighth bits of the first and second operands as arithmetic operation targets. GG2 corresponds to generate signals of ninth bits to twelfth bits of the first and second operands as arithmetic operation targets. GG3 corresponds to generate signals of thirteenth bits to sixteenth bits of the first and second operands as arithmetic operation targets.

GP0 corresponds to propagate signals of the first bits to fourth bits of the first and second operands as arithmetic operation targets. GP1 corresponds to propagate signals of the fifth bits to eighth bits of the first and second operands as arithmetic operation targets. GP2 corresponds to propagate signals of the ninth bits to twelfth bits of the first and second operands as arithmetic operation targets. GP3 corresponds to propagate signals of the thirteenth bits to sixteenth bits of the first and second operands as arithmetic operation targets.

As depicted in FIG. 5, the CLA circuit includes carry generation and propagation blocks 200, 300, 400, and 500, AND gates 170 to 173, and an OR gate 180. The carry generation and propagation blocks 200, 300, 400, and 500 are the same as the carry generation and propagation block 100 explained with reference to FIG. 1. Therefore, explanation of the carry generation and propagation blocks 200, 300, 400, and 500 is omitted. First and second operands of first bits to fourth bits as arithmetic operation targets are input to the carry generation and propagation block 200. First and second operands of fifth bits to eighth bits as arithmetic operation targets are input to the carry generation and propagation block 300. First and second operands of ninth bits to twelfth bits as arithmetic operation targets are input to the carry generation and propagation block 400. First and second operands of thirteenth bits to sixteenth bits as arithmetic operation targets are input to the carry generation and propagation block 500.

A propagate signal GP0 output from the carry generation and propagation block 200, a propagate signal GP1 output from the carry generation and propagation block 300, a propagate signal GP2 output from the carry generation and propagation block 400, a propagate signal GP3 output from the carry generation and propagation block 500, and a carry signal CI are input to the AND gate 170.

A generate signal GG0 output from the carry generation and propagation block 200, a propagate signal GP1 output from the carry generation and propagation block 300, a propagate signal GP2 output from the carry generation and propagation block 400, and a propagate signal GP3 output from the carry generation and propagation block 500 are input to the AND gate 171.

A generate signal GG1 output from the carry generation and propagation block 300, a propagate signal GP2 output from the carry generation and propagation block 400, and a propagate signal GP3 output from the carry generation and propagation block 500 are input to the AND gate 172.

A generate signal GG2 output from the carry generation and propagation block 400 and a propagate signal GP3 output from the carry generation and propagation block 500 are input to the AND gate 173. A generate signal GG3 output from the carry generation and propagation block 500 and signals output from the AND gates 170 to 173 are input to the OR gate 180. A carry CO (corresponding to a seventeenth carry) is generated from the OR gate 180.

Figure 6:
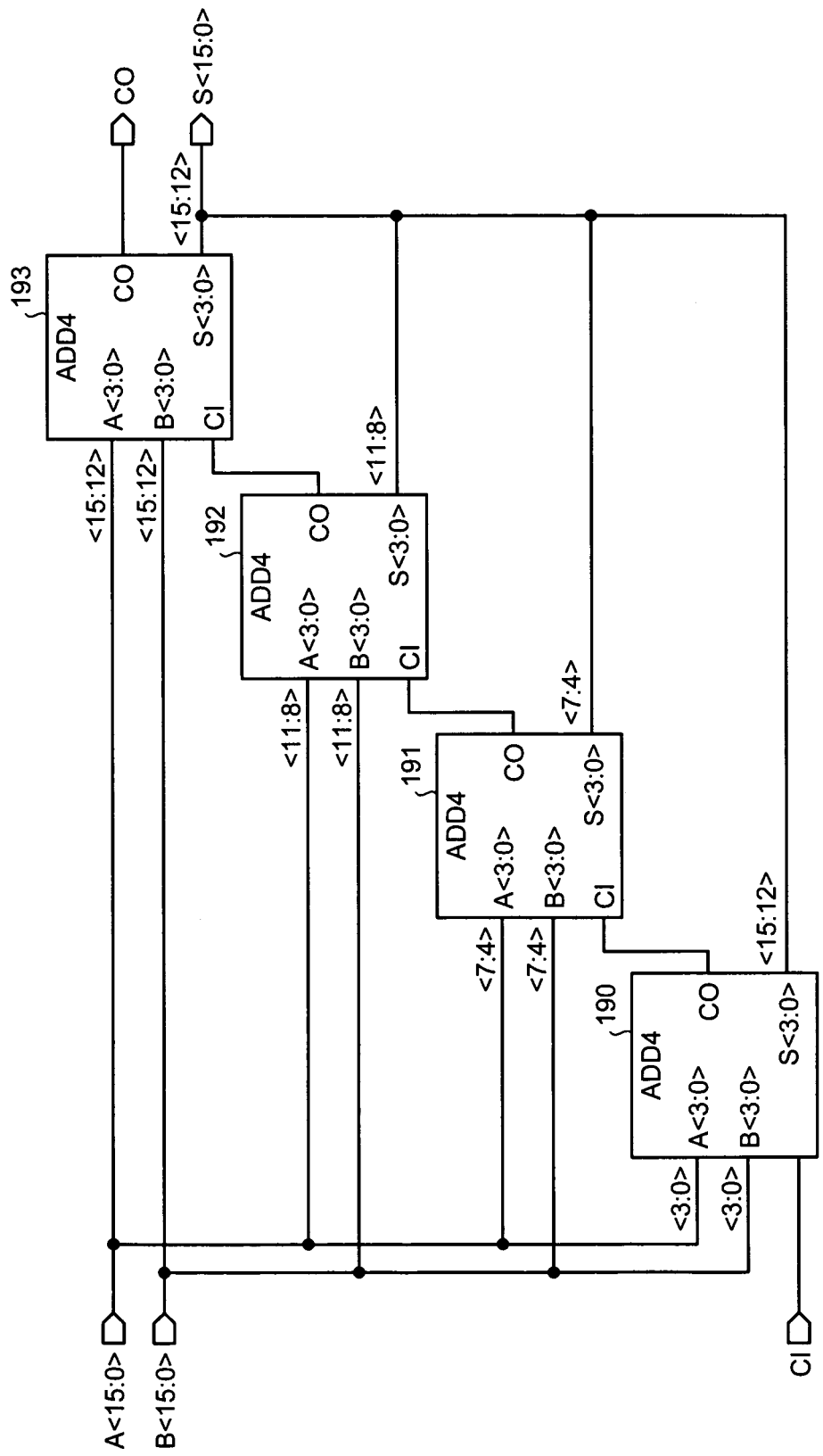
FIG. 6 is a diagram of a conventional ADDER circuit.
Figure 7:
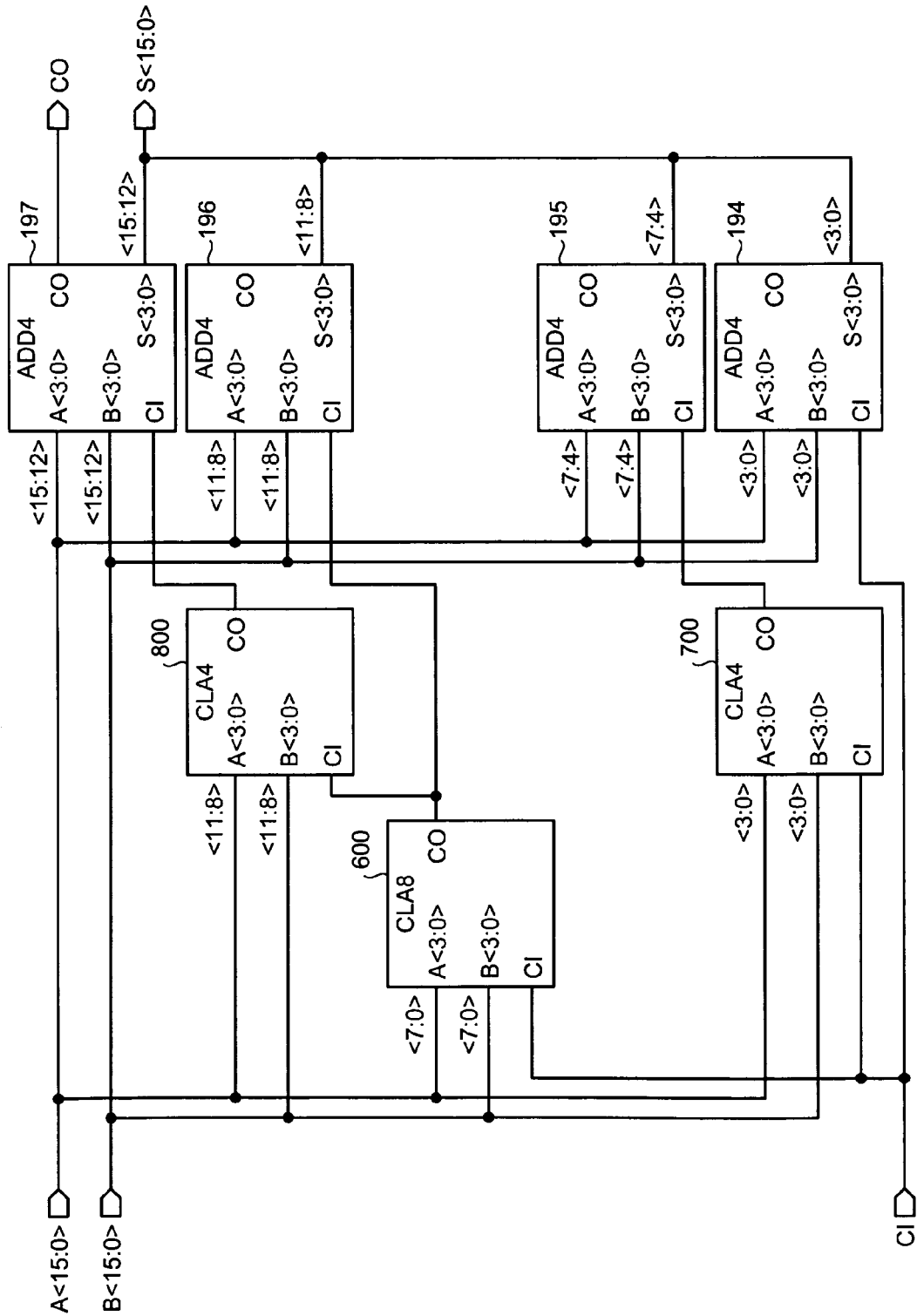
FIG. 7 is a diagram of an ADDER circuit to which the CLA circuit according to the embodiment is applied.

An ADDER circuit to which the CLA circuit according to this embodiment is applied is explained in comparison with a conventional ADDER circuit. FIG. 6 is a diagram of the conventional ADDER circuit. FIG. 7 is a diagram of the ADDER circuit to which the CLA circuit according to this embodiment is applied.

As depicted in FIG. 6, the ADDER circuit in the past includes four-bit full adders 190 to 193. In the ADDER circuit, a carry of the full adder 190 is input to the full adder 191, a carry of the full adder 191 is input to the full adder 192, and a carry of the full adder 192 is input to the full adder 193. Therefore, a carry CO cannot be generated at high speed because a higher-order full adder needs to wait for a carry of a lower-order full adder.

On the other hand, the ADDER circuit to which the CLA circuit according to this embodiment is applied includes, as depicted in FIG. 7, an 8-bit CLA circuit 600 (see FIG. 4), 4-bit CLA circuits 700 and 800 (see FIG. 3), and full adders 194 to 197.

In the ADDER circuit depicted in FIG. 7, unlike the ADDER circuit depicted in FIG. 6, rather than generating a carry signal propagating through the lower-order full adders, the CLA circuits 600, 700, and 800 separately generate carry signals of fourth, eighth, and twelfth bits, respectively (the CLA circuit 600 generates a carry of the eighth bit, the CLA circuit 700 generates a carry of the fourth bit, and the CLA circuit 800 generates a carry of the twelfth bit). Therefore, it is possible to execute addition of operands at this speed. As an example, the addition of 16-bit operands is explained above. However, the present invention is not limited to this. It is also possible to perform addition of n-bits operands by applying the CLA circuit according to this embodiment to an ADDER circuit.

Figure 8:
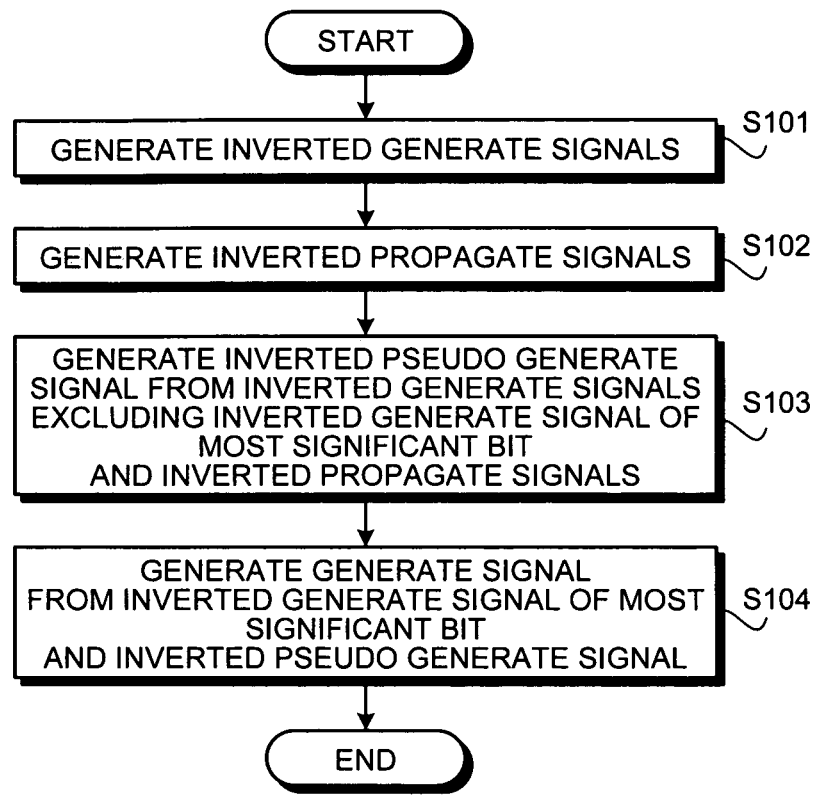
FIG. 8 is a flowchart of a processing procedure of the carry generation and propagation block depicted in FIG. 1.

A processing procedure of the carry generation and propagation block 100 depicted in FIG. 1 is explained. FIG. 8 is a flowchart of the processing procedure of the carry generation and propagation block 100 depicted in FIG. 1. As depicted in FIG. 8, in the carry generation and propagation block 100, the NAND gates 101 to 104 acquire signals of operands as arithmetic operation targets and generate inverted generate signals XG0 to XG3, respectively (step S101).

The NOR gates 110 to 113 acquire the signals of the operands as arithmetic operation targets and generate inverted propagate signals XP0 to XP3, respectively (step S102). The NAND gate 107 generates an inverted pseudo generate signal XGG' from the inverted generate signals excluding the inverted generate signal of a most significant bit (in the case of 4-bit inverted generate signals, the inverted generate signal XG3) among the inverted generate signals and the inverted propagate signals (step S103). At step S103, signals input to the NAND gate 107 are signals output from the NAND gates 105 and 106 and a signal output from the NOR gate 115.

Then, the NAND gate 108 generates a generate signal GG from the inverted generate signal of the most significant bit and the inverted pseudo generate signal XGG' (step S104).

In this way, the inverted logic is applied to the section that generates a generate signal, making it possible to reduce the number of transistors. Further, because the number of stages of the gates is the same as the number of stages in conventional circuit, it is possible to realize an increase in speed of the CLA circuit. The processing procedure of the 4-bit CLA circuit (carry look-ahead circuit) is explained above. However, an n-bit CLA circuit (carry look-ahead circuit) generates a generate signal according to the same procedure.

Figure 9:
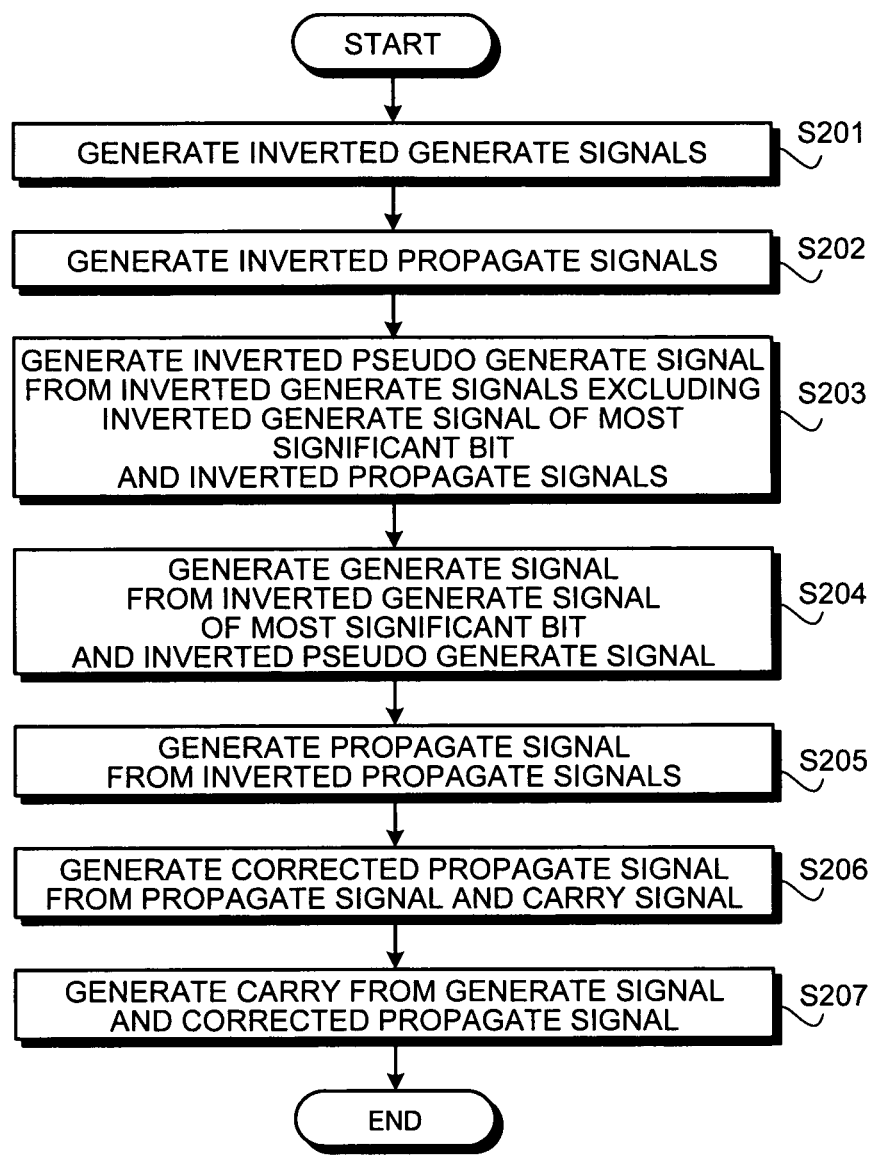
FIG. 9 is a flowchart of a processing procedure of the CLA circuit depicted in FIG. 3.
Figure 10:
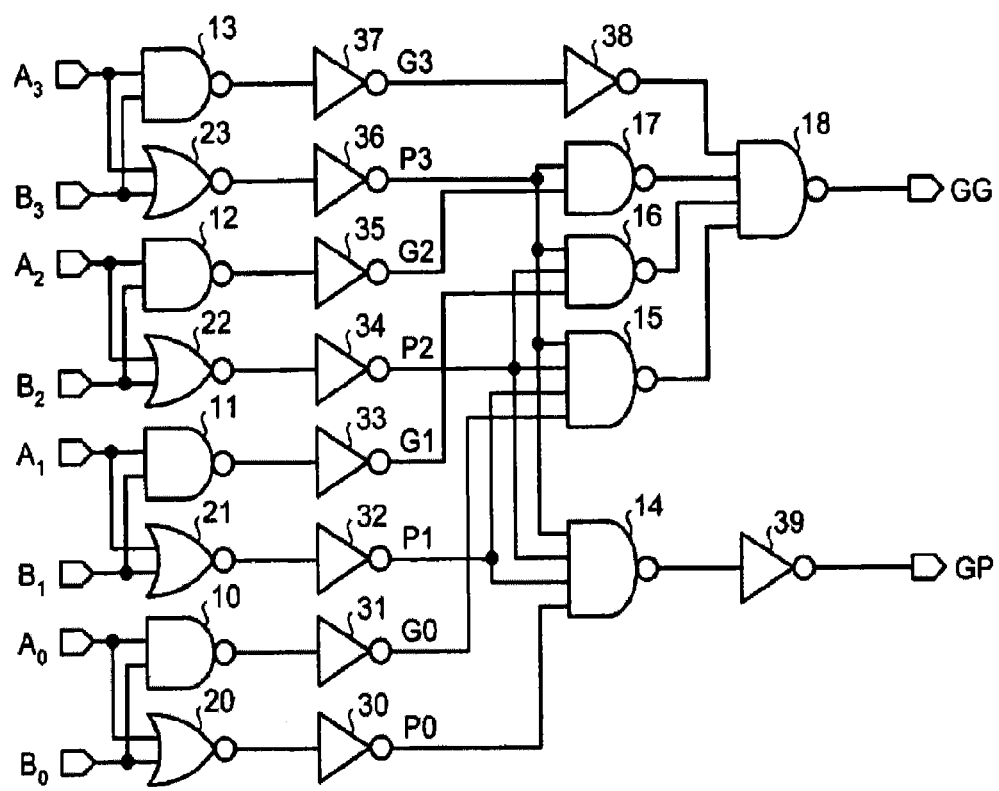
FIG. 10 is a diagram of a carry generation and propagation block of a CLA circuit in the past.

Next, a processing procedure of the CLA circuit depicted in FIG. 3 is explained. FIG. 9 is a flowchart of the processing procedure of the CLA circuit depicted in FIG. 3. As depicted in FIG. 9, the NAND gates 101 to 104 acquire signals of operands as arithmetic operation targets and generate inverted generate signals XG0 to XG3, respectively (step S201).

The NOR gates 110 to 113 acquire the signals of the operands as arithmetic operation targets and generate inverted propagate signals XP0 to XP3, respectively (step S202). The NAND gate 107 generates an inverted pseudo generate signal XGG' from the inverted generate signals excluding the inverted generate signal of a most significant bit (in the case of the 4-bit inverted generate signals, the inverted generate signal XG3) among the inverted generate signals and the inverted propagate signals (step S203). At step S203, signals input to the NAND gate 107 are signals output from the NAND gates 105 and 106 and a signal output from the NOR gate 115.

The NAND gate 108 generates a generate signal GG from the inverted generate signal of the most significant bit and the inverted pseudo generate signal XGG' (step S204). The NOR gate 114 generates a propagate signal GP from the inverted propagate signals (step S205). The AND gate 130 generates a propagating carry signal from the propagate signal GP and a carry signal CI (step S206). The OR gate 140 generates a carry from the generate signal GG output from the NAND gate 108 and the propagating carry signal output from the AND gate 130 (step S207).

In this way, a carry signal is generated by applying the inverted logic to the section that generates a generate signal. This makes it possible to reduce the number of transistors. Further, because the number of stages of the gates is the same as the number of stages in the past, it is possible to realize an increase in speed of the CLA circuit. The processing procedure of the 4-bit CLA circuit is explained above. However, an n-bit CLA circuit generates a carry signal according to the same procedure.

As explained above, the carry generation and propagation block 100 according to this embodiment includes the NAND gate 107 that receives the inverted generate signals excluding the inverted generate signal of the most significant bit among the inverted generate signals and the inverted propagate signals and generates the inverted pseudo generate signal XGG' of a generate output; and the NAND gate 108 that receives the inverted generate signal of the most significant bit among the inverted generate signals and the inverted pseudo generate signal XGG' and outputs the generate signal GG for generating a carry. Therefore, the NAND gate 108 can be used as both a stage (a NOT gate) for resetting the polarity of a signal inverted by the inverse logic and a stage (an AND gate) for resetting a pseudo generate signal by the pseudo carry to a normal generate signal. Consequently, it is possible to reduce the number of inputs of gates without increasing the number of stages of the gates.

Further, because it is possible to reduce the number of inputs of gates without increasing the number of stages of the gates, it is possible to reduce the number of transistors and realize an increase in speed of the CLA circuit.

The embodiment of the present invention is explained above. However, besides the embodiment, the present invention may be carried out in various different embodiments without departing from the technical idea described in claims.

Among the respective kinds of processing explained in the embodiments, all or a part of the kinds of processing explained as being automatically performed may be manually performed. All or a part of the kinds of processing explained as manually performed may be automatically performed according to a publicly known method.

Besides, it is possible to arbitrarily change the processing procedures, the control procedures, the specific names, and the information including various data and parameters explained in this specification and depicted in the drawings unless specifically noted otherwise.

The respective components of the devices depicted in the figures are functionally conceptual and are not always required to be physically configured as depicted in the figure. In other words, specific forms of distribution and integration of the devices are not limited to those depicted in the figures. It is possible to constitute all or a part of the devices to be functionally or physically distributed and integrated in an arbitrary unit according to various loads, states of use, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A carry look-ahead circuit that generates a generate output for generating a carry, from a plurality of inverted generate inputs and a plurality of inverted propagate inputs to peer bits of a first operand and a second operand including a plurality of bits, the carry look-ahead circuit comprising:
a first circuit that receives the inverted generate inputs excluding the inverted generate input of a most significant bit among the inverted generate inputs and the inverted propagate inputs and generates an inverted pseudo generate signal of the generate output; and
a second 2-input circuit that receives the inverted generate input of the most significant bit among the inverted generate inputs and the inverted pseudo generate signal and outputs the generate output, and
wherein the second 2-input circuit is a 2-input NAND gate, and
a number of gate stages of a combination of the first circuit and the 2-input NAND gate is 4 when the first operand and the second operand respectively have 4 bits.

2. The carry look-ahead circuit according to claim 1, further comprising a circuit that receives the inverted propagate inputs and outputs a propagate output for generating the carry.

3. The carry look-ahead circuit according to claim 1, further comprising:
circuits that generate the respective inverted generate inputs as NANDs of the first operand and the second operand; and
circuits that generate the respective inverted propagate inputs as NORs of the first operand and the second operand.

4. The carry look-ahead circuit according to claim 2, further comprising:
a circuit that receives the propagate output and a carry input to output a propagating carry; and
a circuit that receives the generate output and the propagating carry and outputs a carry output.

5. A carry look-ahead method of generating a generate output for generating a carry, from a plurality of inverted generate inputs and a plurality of inverted propagate inputs to peer bits of a first operand and a second operand including a plurality of bits, the carry look-ahead method comprising:
receiving, using a first circuit, the inverted generate inputs excluding the inverted generate input of a most significant bit among the inverted generate inputs and the inverted propagate inputs to generate an inverted pseudo generate signal of the generate output; and
receiving, using a second 2-input circuit, the inverted generate input of the most significant bit among the inverted generate inputs and the inverted pseudo generate signal to output the generate output, and
wherein the second 2-input circuit is a 2-input NAND gate, and
a number of gate stages of a combination of the first circuit and the 2-input NAND gate is 4 when the first operand and the second operand respectively have 4 bits.

6. The carry look-ahead method according to claim 5, further comprising receiving the inverted propagate inputs to output a propagate output for generating the carry.

7. The carry look-ahead method according to claim 5, further comprising:
generating, using circuits, the inverted generate inputs as NANDs of the first operand and the second operand; and
generating, using circuits, the inverted propagate inputs as NORs of the first operand and the second operand.

8. The carry look-ahead method according to claim 6, further comprising:
receiving, using circuits the propagate output and a carry input to output a propagating carry; and
receiving, using circuits the generate output and the propagating carry to output a carry output.

9. A method of generating a generate output GG and a propagate output GP for generating a carry, from first to nth inverted generate inputs $XG0$ to $XG(n-1)$ and first to nth inverted propagate inputs $XP0$ to $XP(n-1)$ to a first operand and a second operand having n-bit width, n being a positive integer, the carry look-ahead method comprising:
generating an inverted pseudo generate signal $XGG'$ obtained by dividing an inverted generate output $XGG$, which is a negative result of the generate output $GG$, by $XG(n-1)$, $GG$, $XGG$, and $XGG'$ being represented as follows:

$GG=$ $G(n-1)+$ $P(n-1) \cdot G(n-2)+$ $P(n-1) \cdot P(n-2) \cdot G(n-3)+$ $P(n-1) \cdot P(n-2) \cdot P(n-3) \cdot G(n-4)+$ $\cdots$ $P(n-1) \cdot P(n-2) \cdot P(n-3) \cdot \ldots \cdot G2 \cdot G1+$ $P(n-1) \cdot P(n-2) \cdot P(n-3) \cdot \ldots \cdot P2 \cdot P1 \cdot G0,$ $XGG=$ $XP(n-1)+$ $XG(n-1) \cdot XP(n-2)+$ $XG(n-1) \cdot XG(n-2) \cdot XP(n-3)+$ $XG(n-1) \cdot XG(n-2) \cdot XG(n-3) \cdot XP(n-4)+$ $\cdots$ $XG(n-1) \cdot XG(n-2) \cdot XG(n-3) \cdot \ldots \cdot XG2 \cdot XP1+$ $XG(n-1) \cdot XG(n-2) \cdot XG(n-3) \cdot \ldots \cdot XG2 \cdot XG1 \cdot XG0,$ and $XGG'=$ $XP(n-1)+$ $XP(n-2)+$ $XG(n-2) \cdot XP(n-3)+$ $XG(n-2) \cdot XG(n-3) \cdot XP(n-4)+$ $\cdots$ $XG(n-2) \cdot XG(n-3) \cdot \ldots \cdot XG2 \cdot XP1+$ $XG(n-2) \cdot XG(n-3) \cdot \ldots \cdot XG2 \cdot XG1 \cdot XG0;$ and receiving, using a 2-input circuit, the nth inverted generate input $XG(n-1)$ and the inverted pseudo generate signal $XGG'$ to output the generate output $GG$.

10. The method according to claim 9, further comprising receiving the first to nth inverted propagate inputs XP0 to XP(n−1) to output the propagate output GP=!(XP(n−1)+XP(n−2)+ . . . +XP0).

11. The method according to claim 9, further comprising:
receiving first to nth bit inputs of the first operand and first to nth bit inputs of the second operand to output first to nth inverted generate signals XG0 to XG(n−1), respectively; and receiving the first to nth bit inputs of the first operand and the first to nth bit inputs of the second operand to output first to nth inverted propagate signals XP0 to XP(n−1), respectively.

\* \* \* \* \*